United States Patent [19]
Vanden Berge

[11] Patent Number: 6,012,033
[45] Date of Patent: Jan. 4, 2000

[54] PROPRIETARY INFORMATION PROTECTION METHOD

[75] Inventor: Thomas A. Vanden Berge, Chandler, Ariz.

[73] Assignee: VLSI Technology, Inc., San Jose, Calif.

[21] Appl. No.: 08/886,278

[22] Filed: Jun. 30, 1997

[51] Int. Cl.[7] .................................................. G06F 17/60
[52] U.S. Cl. ................... 705/1; 380/4; 380/23; 380/25
[58] Field of Search ................ 705/1; 380/3, 4, 380/23, 25

[56] References Cited

U.S. PATENT DOCUMENTS

| | | | |
|---|---|---|---|
| 5,084,824 | 1/1992 | Lam et al. | 364/490 |
| 5,390,297 | 2/1995 | Barber et al. | 364/280 |
| 5,530,752 | 6/1996 | Rubin | 380/4 |
| 5,592,549 | 1/1997 | Nagel et al. | 380/4 |
| 5,757,908 | 5/1998 | Cooper et al. | 380/4 |
| 5,805,802 | 9/1998 | Marx | 380/4 |

*Primary Examiner*—James P. Trammell
*Assistant Examiner*—Nicholas D. Rosen
*Attorney, Agent, or Firm*—Wagner, Murabito & Hao LLP

[57] ABSTRACT

A method for protecting proprietary information. In one embodiment, the present invention is comprised of the steps of inserting a call to license management code within the proprietary information to be protected. The call to the license management code is inserted into the proprietary information such that at least one statement critical to the function of the proprietary information is embedded within the call to the license management code. Next, the present invention encrypts the call to the license management code having the at least one statement critical to the function of the proprietary information embedded therein. In so doing, the present invention produces a first encrypted code such that removal of the first encrypted code results in the removal of the at least one statement critical to the function of the proprietary information. The present invention then stores the first encrypted code and the proprietary information in computer readable memory. In so doing, the present invention allows a call to license management code to be used in such a manner that unauthorized removal of the call to the license management code compromises the integrity and completeness of the proprietary information.

12 Claims, 3 Drawing Sheets

PROPRIETARY INFORMATION PROTECTION METHOD

TECHNICAL FIELD

The present claimed invention relates to the field of proprietary software. More specifically, the present claimed invention relates to the protection of proprietary software.

BACKGROUND ART

In numerous fields such as, for example, the electronic design automation (EDA) industry, vendors will often supply proprietary information to their customers. In attempt to keep the information proprietary, the vendors will often request that the customer sign a non-disclosure agreement, or other type of document intended to protect the vendor's proprietary information. Unfortunately, such paper agreements do not always provide the level of security desired by the vendor.

In another attempt to protect proprietary information, vendors often use license management software. Such license management software is commercially available to vendors (e.g. FLEXlm software available from GLOBEtrotter Software of Campbell, Calif.). License management software typically allows the vendor to control, for example, the allowed duration of use of the proprietary information, the specific use of the proprietary information, the number of users allowed to access the proprietary information, and the like. However, regulation of the proprietary information by such license management software is not entirely secure. That is, by removing a call to such license management software, it is possible to "overide" the vendor's intent for access to the proprietary information to be controlled by the license management software. Additionally, even when such a call to license management software in encrypted, an unscrupulous user may still remove the call, thereby gaining unauthorized access to or use of the proprietary information.

Thus, a need exists for a method to securely protect proprietary information. A further need exists to provide such secure protection while still allowing the proprietary information to be dispersed to licensed or otherwise entitled parties.

DISCLOSURE OF THE INVENTION

The present invention provides a method to securely protect proprietary information. The present invention further provides such secure protection while still allowing the proprietary information to be dispersed to licensed or otherwise entitled parties.

Specifically, in one embodiment, the present invention is comprised of the steps of inserting a call to license management code within the proprietary information to be protected. The call to the license management code is inserted into the proprietary information such that at least one statement critical to the function of the proprietary information is embedded within the call to the license management code. Next, the present invention encrypts the call to the license management code having at least one statement critical to the function of the proprietary information embedded therein. In so doing, the present invention produces a first encrypted code such that removal of the first encrypted code results in the removal of the at least one statement critical to the function of the proprietary information. The present invention then stores the first encrypted code and the proprietary information in computer readable memory. In so doing, the present invention allows a call to license management code to be used in such a manner that unauthorized removal of the call to the license management code compromises the integrity and completeness of the proprietary information.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
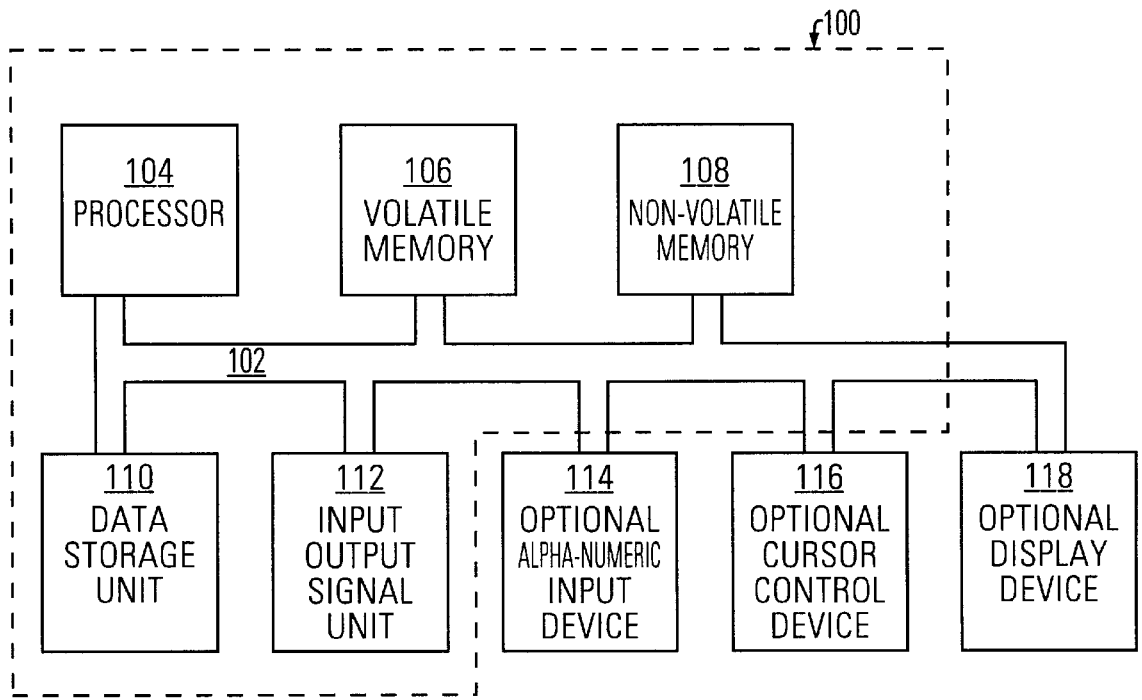
FIG. 1 is a schematic diagram of an exemplary computer system used to perform the proprietary information protection method in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "encrypting", "storing", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT INVENTION

With reference now to FIG. 1, portions of the present proprietary information protection method are comprised of computer-readable and computer-executable instructions which reside, for example, in computer-usable media of a computer system. FIG. 1 illustrates an exemplary computer system 100 used to perform the proprietary information protection method in accordance with one embodiment of the present invention. It is appreciated that system 100 of FIG. 1 is exemplary only and that the present invention can operate within a number of different computer systems including general purpose computers systems, embedded computer systems, and stand alone computer systems specially adapted for proprietary information protection.

System 100 of FIG. 1 includes an address/data bus 102 for communicating information, and a central processor unit 104 coupled to bus 102 for processing information and instructions. System 100 also includes data storage features such as a computer usable volatile memory 106, e.g. random access memory (RAM), coupled to bus 102 for storing information and instructions for central processor unit 104, computer usable non-volatile memory 108, e.g. read only memory (ROM), coupled to bus 102 for storing static information and instructions for the central processor unit 104, and a data storage device 110 (e.g., a magnetic or optical disk and disk drive) coupled to bus 102 for storing information and instructions. A input output signal unit 112 (e.g. a modem) coupled to bus 102 is also included in system 100 of FIG. 1. System 100 of the present invention also includes an optional alphanumeric input device 114 including alphanumeric and function keys is coupled to bus 102 for communicating information and command selections to central processor unit 104. System 100 also optionally includes a cursor control device 116 coupled to bus 102 for communicating user input information and command selections to central processor unit 104. System 100 of the present embodiment also includes an optional display device 118 coupled to bus 102 for displaying information.

Display device 118 of FIG. 1, utilized with the present proprietary information protection method, may be a liquid crystal device, cathode ray tube, or other display device suitable for creating graphic images and alphanumeric characters recognizable to a user. Optional cursor control device 116 allows the computer user to dynamically signal the two dimensional movement of a visible symbol (cursor) on a display screen of display device 118. Many implementations of cursor control device 116 are known in the art including a trackball, mouse, touch pad, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. The present invention is also well suited to directing a cursor by other means such as, for example, voice commands. A more detailed discussion of the present proprietary information protection method is found below.

GENERAL DESCRIPTION OF THE PRESENT PROPRIETARY INFORMATION PROTECTION METHOD

Figure 2:
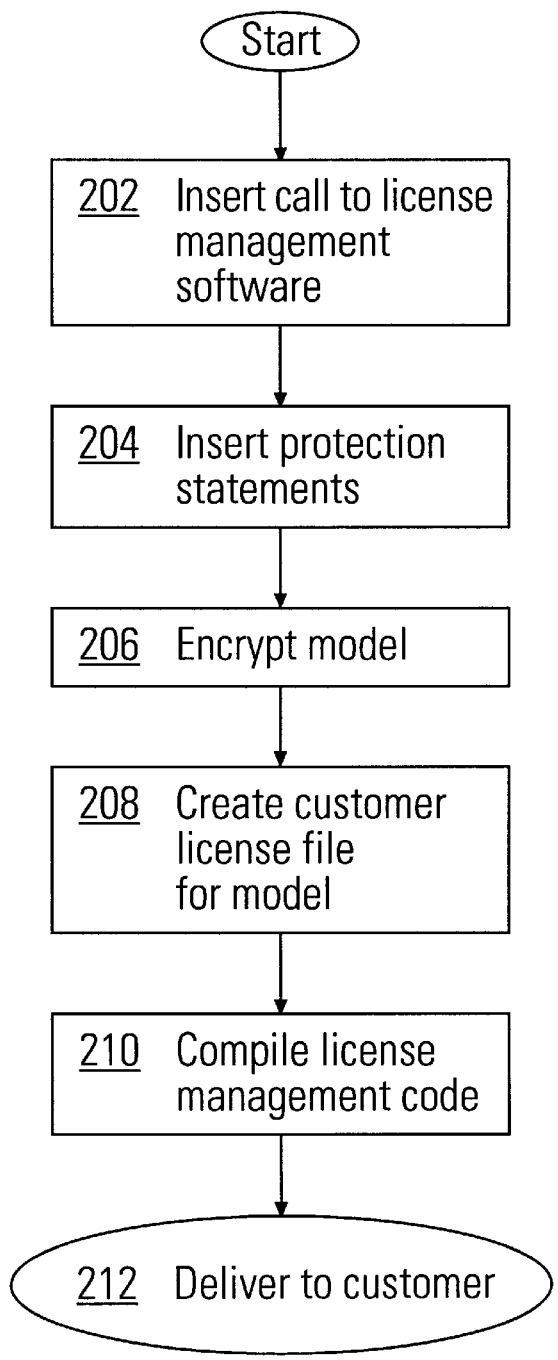
FIG. 2 is a flow chart of steps performed in accordance with one embodiment of the present claimed invention.

With reference next to FIG. 2, a flow chart 200 of steps used by the present proprietary information protection method is shown. Flow chart 200 includes processes of the present invention which, in one embodiment, are carried out by a processor under the control of computer-readable and computer-executable instructions. The computer-readable and computer-executable instructions reside, for example, in data storage features such as computer usable volatile memory 106 and/or computer usable non-volatile memory 108 of FIG. 1. The computer-readable and computer-executable instructions are used to control, for example, the operation and functioning of central processing unit 104 of FIG. 1.

With reference again to FIG. 2, in step 202 the present invention inserts a call to license management code or "license management software" within the proprietary information such that at least one statement critical to the function of the proprietary information is embedded within the call to the license management code. In the present embodiment, the license management code is comprised of FLEXlm software available from GLOBEtrotter Software of Campbell, Calif. The present invention is, however, well suited to use with various other types of license management code known in the art. The following discussion of the present invention will pertain to an embodiment in which the method of the present invention is used in conjunction with simulation model software utilized in the EDA industry. However, although such an embodiment is described in detail herein, the present invention is also well suited to protecting various other types of proprietary information in numerous other fields. Furthermore, the present embodiment further recites the use of a simulation model employing Verilog Hardware Description Language (HDL). Although such a language is used in the present embodiment, the present invention is also well suited to use with various other languages and platforms.

Referring still to FIG. 2, in the present embodiment, the call to license management code is inserted within simulation model software such that at least one statement critical to the function of the simulation model software is embedded within the call to the license management code. More specifically, in the present embodiment, the call to the license management code is inserted within an initial statement of the simulation model. Table I below shows a portion of simulation software containing an initial statement (i.e. the statement beginning with the term "buf u110 (web_b, web)").

TABLE I

```
'celldefine
'delay_mode_path
suppress_faults
'enable_portfaults
module vcc7ra5_2048x16_xn (ar ,aw ,di ,do ,web );
parameter
...
//DEFINE PRIMARY I/O
...
//DEFINE INTERNAL VARIABLES
...
buf u110 (web_b, web) ;
vcc7ra5_2048x16_xn_LOWER mem (ar_b, aw_b, di_b, do_b,
web_b, web_di_setup, web_aw_setup, web_minw, web_aw_hold,
web_di_hold) ;
endmodule
'nosuppress_faults
'disable_portfaults
'endcelldefine
module vcc7ra5_2048x16_xn_LOWER (ar_b, aw_b, di_b, do_b,
web_b, web_di_setup, web_aw_setup, web_minw, web_aw_hold,
web_di_hold) ;
...
endmodule
```

As stated above in conjunction with step 202, the present invention then inserts the call to the license management code within an initial statement of the simulation model. Table II below shows a portion of simulation software containing an initial statement having the call to the license management code inserted therein. Specifically, the call to the license management code (which begins with $VLSIcheckThis License) is inserted into the simulation software. The call to the license management code is inserted into the simulation software such that at least one statement critical to the function of the simulation software (e.g. the "buf u110 (web_b, web)" initial statement) is embedded within the call to the license management code.

TABLE II

```
'celldefine
'delay_mode_path
'suppress_faults
'enable_portfaults
module vcc7ra5_2048x16_xn (ar ,aw ,di ,do ,web ) ;
parameter
...
//DEFINE PRIMARY I/O
...
//DEFINE INTERNAL VARIABLES
...
// Since one could simply edit out the encrypted portion of the model in
// an affort to disable the licensing, it's critical that the code
// within the 'protect and 'unprotect block contain at least one
// statement critical to the function of the model. That way, if the
// encrypted section is edited out, the model will be disabled. Since
// this is just an example, we accomplish this in this model
// simply by including the buf definition for u110. Normally, you'd
// include more of the model within the 'protect/' unprotect block.
'protect
buf u110 (web_b, web) ;
initial
begin
// Call license validation and checkout function. In the production
// version of this code, since you can't directly pass args to C
// from Verilog, the checkThisLicense function would use the
// PLI to get the license feature name, version, and vendor string
// coded here as 'parameter definitions.
// To keep the feature name string out of executable, it needs
// to appear encoded in the source and then decoded before use.
// For the purpose of this prototype, the feature name, version and
// vendor string variables are hardcoded in VLSIcheckThisLicense.
//
```

TABLE II-continued

```
// Although not implemented in this example, we could use the
// 'misctf' system function to trap when the simulation was about to
// end. That would be the best point at which to checkin the license.
// if we were limiting the number of simultaneous uses. Otherwise,
// we'd immediately check if back in since we only want to validate
// the customer is allowed to use the license. This latter policy is
// what is implemented in this prototype.
// If there is any problem with the license for this model,
// VLSIcheckThisLicense routine will not return.
$VLSIcheckThis License( ) ;
end
'endprotect
vcc7ra5_2048x16_xn_LOWER mem (ar_b, aw_b, di_b, do_b,
web_b, web_di_setup, web_aw_setup, web_minw, web_aw_hold,
web_di_hold) ;
endmodule
'nosuppress_faults
'disable_portfaults
endcelldefine
module vcc7ra5_2048x16_xn_LOWER (ar_b, aw_b, di_b, do_b,
web_b, web_di_setup, web_aw_setup, web_minw, web_aw_hold,
web_di_hold) ;
...
endmodule
```

In step 204 of the present embodiment, the present invention inserts protection statements (which begin with the 'protect statement and end with the 'endprotect statement). The statements are used to define the starting and ending points for encryption functions of the Verilog HDL language of the present simulation model. That is, the present embodiment uses verilog encryption capability to encrypt the call to license code having the statement critical to the function of the proprietary information embedded therein. Although such protection statements are used in the present embodiment, it will be understood that the present invention is also well suited to the use of various other types of protection statements corresponding to various other languages.

Referring now to step 206, the present embodiment then encrypts the portion of the simulation model containing the call to license management code having the statement critical to the function of the proprietary information embedded therein. In the present embodiment, the encryption is performed on the code residing between the 'protect statement and the 'endprotect statement. In so doing, the present invention produces a first encrypted code. By embedding a statement critical to the function of the present simulation model within the call to the license management code, removal of the first encrypted code results in the removal of the statement critical to the function of the simulation model. Thus, an unscrupulous user of proprietary information containing the present invention will compromise the integrity or operation of the proprietary information by attempting to remove the call to the license management code. That is, by removing the call to the license management code, a statement critical to the function of the proprietary information will also be inadvertently removed. Furthermore, if a user simply attempts to remove the encrypted portion of the proprietary information, user will be removing a statement critical to the function of the proprietary information. Table III below shows the code of Table II after encryption step 206. The encrypted portion of code begins just after the 'protected statement and ends just before the 'endprotected statement.

TABLE III

```
'celldefine
'delay_mode_path
'suppress_faults
'enable_portfaults
module vcc7ra5_2048x16_xn (ar ,aw ,di ,do ,web ) ;
parameter
...
//DEFINE PRIMARY I/O
...
//DEFINE INTERNAL VARIABLES
...
// Since one could simply edit out the encrypted portion of the model in
// an affort to disable the licensing, it's critical that the code
// within the 'protect and 'unprotect block contain at least one
// statement critical to the function of the model. That way, if the
// encrypted section is edited out, the model will be disabled. Since
// this is just a trivial example, we accomplish this in this model
// simply by including the buf definition for u110. Normally, you'd
// include more of the model within the 'protect/ 'unprotect block.
'protected
Y1]
:1SQV5DT^ <UMbS2z09Ngk1=C_1=b\EShLD'JE1YKH2oBT@dM8gh
m0kcJo4<EH^ad^JApWgofM6K;
@jEM07Y0kB1Reb:MXKi<L^^@1L4^YUWST
[50kDQLiJ33PBJiF\FdaSpC] fD =
3lj<kmb72i@<Kj\oM0dhcdqMi<cHmq?
<em\BXU15NmcD0nMFD340F^j5LYVF;
AK>DbpAbm8^XqCaX@jgeqWBg9mJ7^D9<;
<3?F1I'DK1fPo<UY2HaL4^'ZEo [HG: b<_Ljg7W
'iIFidpE52iY<pdD8n7Xpi8f [V'pmP0e_'pdB<o]
dqT93J809mBLE71NaLHC'M8A'akcc4HeHFPdSgk'pK7 [Jo1p:
=8jP1qCEZQT7@gDLLHcK3LFYkU34Lo<Z54HVIa
[yh0JE4gcgVW:_D1J[Veld?68KG?9FBQ1N9PLdqVh^N:
apL'feCQpm^Y>c9qT7@a]_p2110?_qH:
c7c=pG>aJbdMYHd5D3R[aXH;nP7Eb@iVirL5<HU1Ree^0_Hi0 =
7@S2jT?'
Yfl2FfqD<5\hkpCRKoZJp\c<YXWpEd\Znlp?K01_T6_LahDDdQm;^954
zo0^HRHbfM;[Xj5BGQKANBHOI$
'endprotected
vcc7ra5_2048x16_xn_LOWER mem( ar_b ,aw_b ,di_b ,do_b ,
web_b,
web_di_setup, web_aw_setup, web_minw, web_aw_hold,
web_di_hold) ;
endmodule
'nosuppress_faults
'disable_portfaults
'endcelldefine
module vcc7ra5_2048x16_xn_LOWER mem( ar_b ,aw_b ,di_b,
do_b ,
web_b , web_di_setup, web_aw_setup, web_minw, web_aw_hold,
web_di_hold) ;
...
endmodule
```

In step 208, the present invention creates a customer license file for the simulation model. More specifically, in the present embodiment an intermediate step is performed such that the call to the license management code is comprised of two parts. First, the present embodiment calls a portion of code. Second, the portion of code then calls the license management code. Although such an approach is used in the present embodiment, the present invention is also well suited to operating without the above-described two-step approach to call the license management code. Table IV below lists one embodiment of the portion of the code which is used to call the license management code. Table V below lists one embodiment of the customer license file which is created for the simulation model. That is, the code of Table V is used to determine whether the customer/user has authorization to use/access the proprietary information.

TABLE IV

```
/* All functions are prefixed with "VLSl" to ensure no Iink conflicts with
   Verilog routines */
#include <stdio.h>
#include <stdlib.h>
#include <malloc.h>
#include <string.h>
/* Not sure if all of these header files are needed */
#include <unistd.h>        /* for gethostid */
#ifdef MACHINE_HP
#include <sys?utsname.h>
#include <fcntl.h>
#include <netio.h>
#endif
#include <ctype.h>
#include "1 mclient.h"
#include "1m_code.h"
int VLSlcheckThisLicense( )
{
/* These strings must be at least as long as the longest string plus 1
   for the null terminator */
char nameStr [8], verStr [4];
int rtn;
/* This is a crude method to ensure the name of the license feature
   does not appear in the executable symbol table. In production,
   we should localize this info in the Verilog HDL model and retrieve
   it using the PLI. */
    char cn2 = 'c',
         cn5 = 'a',
         cn4 = 'r',
         cn1 = 'c',
         cn6 = '5',
         cn0 = 'v',
         cn3 = '7',
         cv1 = '.',
         cv0 = '2',
         cv2 = '1';
sprintf(nameStr, "%c%c%c%c%c%c%c", cn0, cn1, cn2, cn3, cn4, cn5,
cn6);
sprintf(verStr, "%c%c%c", cv0, cv1, cv2);
rtn = VLSlcheckLicense(nameSTR, verSTR, " ");
/* It would be better if VLSlcheckLicense could return a value to
   Verilog which indicated success or failure, but functions don't
   appear to work correctly in Verilog PLI. Therefore, we'll just
   print a message and exit the program. */
if (rtn !=0)
   io_printf("The program was unable to check out a license for this for
this model /nand will now exit. \n");
   return (rtn);
}
int VLSlcheckLicense(feature, version, vendorString)
char *feature, *version, Vendorstring;
{
int status = 0, daysLeft = 0;
CONFIG *thisConfig;
char message [256]
/* PROBLEM: Variables declared stsatic may be a problem in
   common code which may be used by seperate calls to this function for
   checking out different licenses. However, if the license checkout and
   checkin calls are made
   at different times, LM_HANDLE would need to be declared static.
   Since
   the calls are made at the same time in this example, it's not a
   problem.
*/
LM_HANDLE *thisJob + (LM_HANDLE *)0; /* Current license job */
LM_CODE(code, ENCRYPTION-SEED1, ENCRYPTION-SEED2,
      VENDOR_KEY1, VENDOR_KEY2, VENDOR_KEY3,
VENDOR_KEY4, VENDOR_KEY5);
status = 1c_checkout(this Job, feature, version, 1, LM_CO_NOWAIT,
&code,
                LM_DUP_NONE);
}
if (status) {
   sprintf (message, "\nFlexlm license error for feature
(%s)\n%s\nPlease contact your local VLSl representative for
assistance. \n\n", feature, 1c_errstring(thisJob));
VLSlprintError(message);
}
else {
```

TABLE IV-continued

```
    /* Report any error with the licensing (number of days)
        and check the vendorstring
        Return 0 if license is OK else non zero */
thisConfig = 1c_auth_data(thisJob, feature);
/* If vendorstring is NULL, checks for vendor string are disabled.
    Otherwise, it's used to determine what features are available */
if (vendorString != (char*) NULL &&
    thisConfig->1c_vendor_def != (char*) NULL &&
    strstr(thisConfig->1c_vendor_def, vendorString) == (char*) NULL
&&
    strstr(vendorString, thisConfig->1c_vendor_def) == (char*) NULL
) {
    status = 1;
    sprintf(message, "\nThis feature (%s) is not licensed for this mode
(%s) of operation.\nPlease contact your local VLSl representative for
an update.\n\n", feature, vendorString);
            VLSlprintError(message);
        }
daysLeft = 1c_expire_days(thisJob, thisConfig);
if (daysLeft < 46) {
    sprintf (message, "\nYour license for this feature (%s) will expire in
%d days\nPlease contact your local VLSl representative for an
update. \n\n", feature, daysLeft);
            VLSlprintError(message);
        }
    }
/* Check the license back in since all we want is to verify the user is
authorized to use the model (we're not counting the number of
licenses)
*/
if (thisjob != (LM_HANDLE *) NULL) {
    1c_checkin(thisJob, feature, 0); /* checkin the license */
    1c_free_job(thisJob);        /* free the job      */
}
return(status);
}
VLSlprintError(errorString)
char *errorString;
{
    io_printf("%s", errorString0
}
```

TABLE V

```
#include "veriuser.h"
#include "vxl_veriuser.h"
char *veriuser_version_str =" ";
extern int VLSlcheckThisLicense( );
int VLSlcheckThisLicenseSize( )
{
    ?* Returns the size of an int (in bits) since that's what
        VLSlcheckThisLicense returns. This is needed to interface
Verilog
        to C when defined as a userfunction. */
return(sizeof(int));
}
int (*(endofcompile_routines[]) ( ) =
{
    /*** my_eoc_routine, ***/
    0 /*** final entry must be 0 ***/
};
bool err_intercept(level, facility, code)
int level; char *facility; char *code;
{return(true); }
s_tfcell veriusertfs[]=
{
    /*** Template for an entry:
    { usertaskluserfunction, data,
        checktf( ), sizetf( ), calltf( ), misctf( ),
        "$tfname", forwref?, Vtool?, ErrMsg?},
    Example:
{ usertask, 0, my_check, 0, my_func, my_misctf, "$my_task"},
***/
```

TABLE V-continued

```
/*** add user entries here ***/
    {usertask, 0, 0, 0, VLSlcheckThisLicense, 0,
    "$VLSlcheckThisLicense", 1},{0} /*** final entry must be 0 ***/
};
```

At step 210, the present invention then compiles the license management code.

In step 212, the present embodiment stores the proprietary information including the first encrypted code in computer readable memory. In so doing, the proprietary information including the protection provided by the present invention is in condition to be delivered to the customer. It will be understood that the present invention is also well suited to being delivered to the customer electronically, or by other means.

Figure 3:
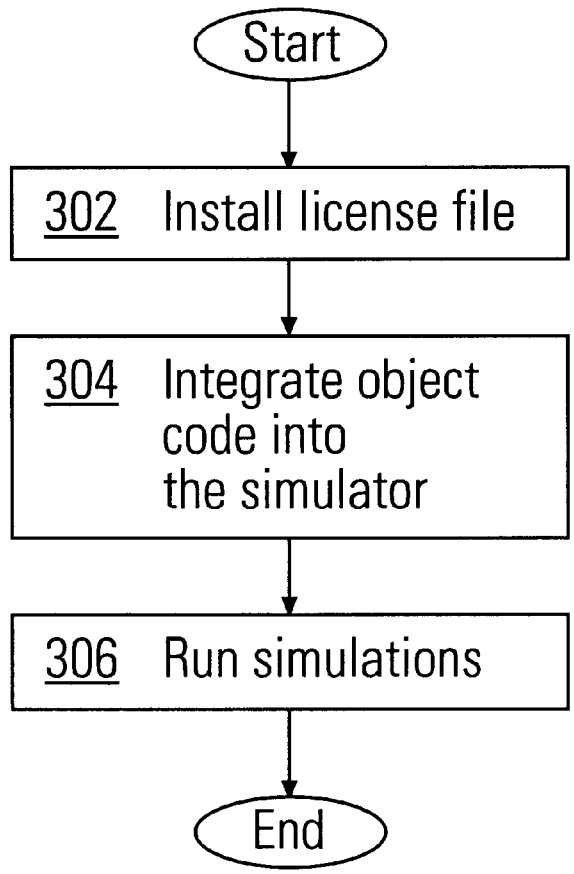
FIG. 3 is a flow chart of steps performed in accordance with one embodiment of the present claimed invention.

With reference next to FIG. 3, a flow chart of steps employed by a customer using proprietary information protected by the present invention is shown. As shown in step 302, the customer first installs the license file.

Next, as shown in step 304, a user of proprietary information protected by the present invention integrates object code (containing the call to license management code with a statement critical to the function of the proprietary information embedded therein) into the simulation model.

Finally, as shown in step 306, a user of proprietary information protected by the present invention utilizes the proprietary information. Furthermore, any attempt at this point by the user to remove the protection provided by the present invention will result in the removal of a statement critical to the functioning of the proprietary information. Hence the present invention provides protection of proprietary information without substantially complicating or disrupting the customer's authorized use of or access to the proprietary information.

Thus, the present invention provides a method to securely protect proprietary information. The present invention further provides such secure protection while still allowing the proprietary information to be dispersed to licensed or otherwise entitled parties.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A method for protecting license restricted proprietary information, said method comprising the steps of:
   a) inserting a call to license management code within said proprietary information such that at least one statement critical to the function of said proprietary information is embedded within said call to license management code;
   b) encrypting said call to license management code having said at least one statement critical to the function of said proprietary information embedded therein to produce a first encrypted code such that removal of said first encrypted code results in the removal of said at least one statement critical to the function of said proprietary information; and c) storing said first encrypted code and said proprietary information in computer readable memory.

2. The computer-implemented method as recited in claim 1 wherein step a) comprises:

inserting a call to license management code within a simulation model such that at least one statement critical to the function of said simulation model is embedded within said call to license management code.

3. The computer-implemented method as recited in claim 2 wherein step a) comprises:

inserting a call to license management code within an initial statement of said simulation model such that said initial statement of said simulation model is embedded within said call to license management code.

4. The computer-implemented method as recited in claim 1 wherein step a) further comprises:

using verilog encryption capability to encrypt said call to license code having said at least one statement critical to the function of said proprietary information embedded therein.

5. A computer-usable medium having computer-readable program code embodied therein for causing a computer to perform the steps of:

a) receiving an information file stored within computer-readable memory, said information file including a call to license management code and proprietary information, said call to license management code and said proprietary information arranged such that at least one statement critical to the function of said proprietary information is embedded within said call to license management code; and b) encrypting said call to license management code having said at least one statement critical to the function of said proprietary information embedded therein such that removal of said encrypted call to license management code results in the removal of said at least one statement critical to the function of said proprietary information.

6. The computer-usable medium of claim 5 having computer-readable program code embodied therein for causing said computer performing step a) to further perform the step of:

receiving an information file including a call to license management code and a simulation model, said call to license management code and said simulation model arranged such that at least one statement critical to the function of said simulation model is embedded within said call to license management code.

7. The computer-usable medium of claim 6 having computer-readable program code embodied therein for causing said computer performing step a) to further perform the step of:

receiving an information file including a call to license management code and a simulation model arranged such that an initial statement of said simulation model is embedded within said call to license management code.

8. The computer-usable medium of claim 5 having computer-readable program code embodied therein for causing said computer performing step b) to further perform the step of:

using verilog encryption capability to encrypt said call to license management code having said at least one statement critical to the function of said proprietary information embedded therein.

9. A computer system comprising:

a processor;

an address/data bus coupled to said processor;

computer usable media coupled to communicate with said processor, said processor for performing the steps of:

a) receiving an information file stored within computer-readable memory, said information file including a call to license management code and proprietary information, said call to license management code and said proprietary information arranged such that at least one statement critical to the function of said proprietary information is embedded within said call to license management code; and b) encrypting said call to license management code having said at least one statement critical to the function of said proprietary information embedded therein such that removal of said encrypted call to license code results in the removal of said at least one statement critical to the function of said proprietary information.

10. The computer system of claim 9 wherein said processor performing step a) further performs the step of:

receiving an information file including a call to license management code and a simulation model, said call to license management code and said simulation model arranged such that at least one statement critical to the function of said simulation model is embedded within said call to license management code.

11. The computer system of claim 10 wherein said processor performing step a) further performs the step of:

receiving an information file including a call to license management code and a simulation model arranged such that an initial statement of said simulation model is embedded within said call to license management code.

12. The computer system of claim 9 wherein said processor performing step b) further performs the step of:

using verilog encryption capability to encrypt said call to license management code having said at least one statement critical to the function of said proprietary information embedded therein.

* * * * *